United States Patent
Mansour et al.

(10) Patent No.: US 6,181,917 B1
(45) Date of Patent: *Jan. 30, 2001

(54) METHOD AND SYSTEM FOR DESIGNING A CELLULAR COMMUNICATION SYSTEM

(75) Inventors: Nagi Azzouz Mansour, Boulder; Louis Anthony Cox, Jr., Denver, both of CO (US)

(73) Assignee: MediaOne Group, Inc., Englewood, CO (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/574,873

(22) Filed: Dec. 19, 1995

(51) Int. Cl.[7] ..................................................... H04B 7/00
(52) U.S. Cl. .............................. 455/63; 455/67.3; 455/423
(58) Field of Search ................................ 455/63, 69, 67.1, 455/33.1, 56.1, 67.3, 226.1, 228.2, 423, 424, 422, 446; 370/333, 335, 332, 372

(56) References Cited

U.S. PATENT DOCUMENTS

| 4,144,411 | 3/1979 | Frenkiel ................................... 179/2 |
| 4,667,202 | 5/1987 | Kammerlander et al. ............ 342/457 |
| 5,095,500 | * 3/1992 | Tayloe et al. ............................ 379/32 |
| 5,151,704 | 9/1992 | Gunmar et al. ....................... 342/360 |
| 5,179,722 | 1/1993 | Gunmar et al. ...................... 455/33.1 |
| 5,265,119 | * 11/1993 | Gilhousen et al. ....................... 375/1 |
| 5,293,640 | 3/1994 | Gunmar et al. ...................... 455/33.1 |
| 5,398,276 | 3/1995 | Lemke et al. .......................... 379/21 |
| 5,434,798 | 7/1995 | Madebrink et al. .................. 364/514 |
| 5,442,804 | 8/1995 | Gunmar et al. ...................... 455/33.1 |
| 5,448,621 | 9/1995 | Knudsen ................................ 379/58 |
| 5,455,967 | 10/1995 | Amezawa et al. ...................... 455/69 |
| 5,475,870 | * 12/1995 | Weaver, Jr. et al. ................. 455/67.1 |
| 5,499,395 | * 3/1996 | Doi et al. ............................. 455/33.1 |
| 5,548,812 | * 8/1996 | Padovani et al. .................... 455/33.2 |
| 5,584,049 | * 12/1996 | Weaver, Jr. et al. ................. 455/67.1 |

OTHER PUBLICATIONS

A. Gamst, et al., Cellular Radio Network Planning, IEEE AES Magazine, Feb. 1986.

* cited by examiner

Primary Examiner—Thanh Cong Le
(74) Attorney, Agent, or Firm—Brooks & Kushman P.C.

(57) ABSTRACT

A method and system for designing a cell for a Code Division Multiple Access (CDMA) communication system and the like. The method includes measuring error rate as a function of signal level at a selected radio frequency, and determining a signal level corresponding to a selected error rate based on the measurements of error rate as a function of signal level. The method also includes determining a coverage area based on the signal level determined and a voice quality factor. The system includes input and output devices, a processor, memory and software for performing the method.

20 Claims, 2 Drawing Sheets

METHOD AND SYSTEM FOR DESIGNING A CELLULAR COMMUNICATION SYSTEM

TECHNICAL FIELD

This invention relates to a method and system for designing a cell for a Code Division Multiple Access (CDMA) communication system and the like.

BACKGROUND OF THE INVENTION

Code Division Multiple Access (CDMA) is one of the more recently developed radio technologies competing in the cellular/microcellular and Personal Communication Services (PCS) market arenas. CDMA has the advantage of providing approximately double the coverage area in comparison to standard Global Systems for Mobile Communications (GSM), which are Time Division Multiple Access (TDMA) based. The majority of PCS providers are therefore moving toward CDMA system development and deployment.

The first step in designing a CDMA system is to identify a technique for determining cell size. As is readily apparent, larger cells provide for a more economical system. At this time, however, there is no standard technique for cell design in a CDMA system. It is well recognized by those of ordinary skill in the art, however, that a number of parameters affect such cell design including the radio frequency (RF) employed (e.g., 800 MHz or 1800 MHz), Frame Error Rate (FER), traffic loading, signal level, terrain between the base station and the mobile location, surface cover (i.e., urban, suburban, rural, etc.) between the base station and the mobile location, and voice quality.

A number of prior art methods and systems exist for use in such cell design, such as the method disclosed by A. Gamst et al. in "Cellular Radio Network Planning", IEEE AES Magazine, February, 1986.

However, the Generalized Radio Network Design (GRAND) technique discussed therein, as well as other prior art cellular communication planning tools, such as that disclosed in U.S. Pat. No. 5,293,640 issued to Gunmar et al., are directed to optimizing a cellular system with respect to frequency to accommodate a certain traffic demand, or to determining the effect of different antenna patterns on propagation.

As a result, such prior art methods and systems fail to strictly or accurately define coverage areas and cell boundaries. Thus, there is a need for an improved method and system for designing a cell in a CDMA communication system and the like, such as GSM or other TDMA based systems. Such an improved method and system would, of course, account for the well known parameters associated with such cell design, with emphasis on those parameters having the most importance to proper operation of the communication system, particularly signal level, error rate and voice quality.

More particularly, such a method and system would combine measured field data in a CDMA system or the like representing error rate and voice quality as a function of signal level. From such relations, the signal level for a desired error rate and voice quality level can be determined given the prevailing environmental conditions, including terrain and surface cover (i.e., urban, suburban, rural, etc.). In contrast to the prior art, however, such an improved method and system would provide for accurate determination of coverage areas and cell boundaries for the desired signal level.

SUMMARY OF THE INVENTION

Accordingly, it is the principle object of the present invention to provide an improved method and system for designing a cell for a Code Division Multiple Access (CDMA) communication system and the like.

According to the present invention, then, a method and system are provided for designing a cell for a CDMA communication system and the like. The method of the present invention comprises measuring error rate as a function of signal level at a selected radio frequency (RF), and determining a signal level corresponding to a selected error rate based on the measurements of error rate as a function of signal level. The method further comprises determining a coverage area based on the signal level determined and a voice quality factor.

The system of the present invention comprises means for measuring error rate as a function of signal level at a selected RF, and means for determining a signal level corresponding to a selected error rate based on the measurements of error rate as a function of signal level. The system further comprises means for determining a coverage area based on the signal level determined and a voice quality factor.

These and other objects, features and advantages will be readily apparent upon consideration of the following detailed description in conjunction with the accompanying drawings.

DESCRIPTION OF THE PREFERRED EMBODIMENT(S)

Figure 1:
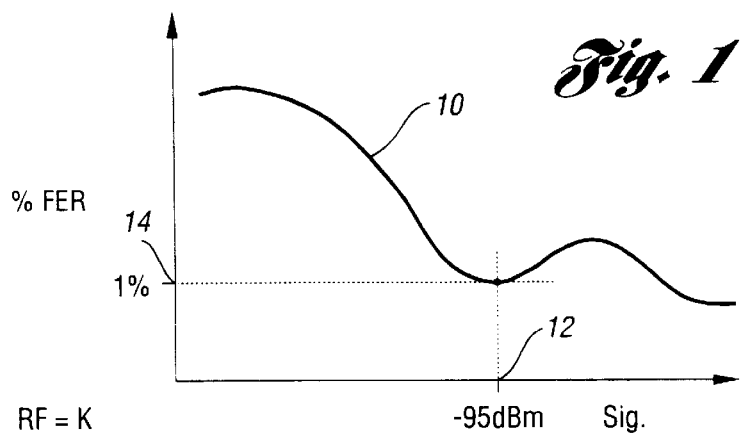
FIG. 1 is a graphic representation of signal level versus Frame Error Rate (FER) according to the method and system of the present invention.

Referring first to FIG. 1, a graphic representation of signal level versus Frame Error Rate (FER) according to the method and system of the present invention is shown. Such a graphic representation (10) is obtained from the relationship between FER and signal level determined via CDMA field measurements taken at various mobile locations.

The mobile locations where such measurements are taken should approximately correspond to those or similar locations where the CDMA system is to be deployed. In addition, the measurements should be taken at the desired frequency band (e.g., 800 MHz or 1800 MHz). The relationship between FER and signal level determined by such measurements will be a function of the prevailing terrain and surface cover (i.e., urban, suburban, rural, etc.) at the locations where the measurements were taken.

Thereafter, the relationship between FER and signal level as determined above is fit with a cubic spline. It should be noted, however, that any other fitting technique may also be employed. As a result, the signal level (12) at any given FER (14) may then be determined according to the graphic representation depicted in FIG. 1. More particularly, as will be discussed in greater detail below, the signal level determined is preferably that signal level at approximately a 1%

FER for CDMA. In the example depicted in FIG. 1, such a signal level is approximately −95 dBm. For TDMA based systems, such as GSM, a Bit Error Rate (BER) of approximately 3% is acceptable.

Figure 2:
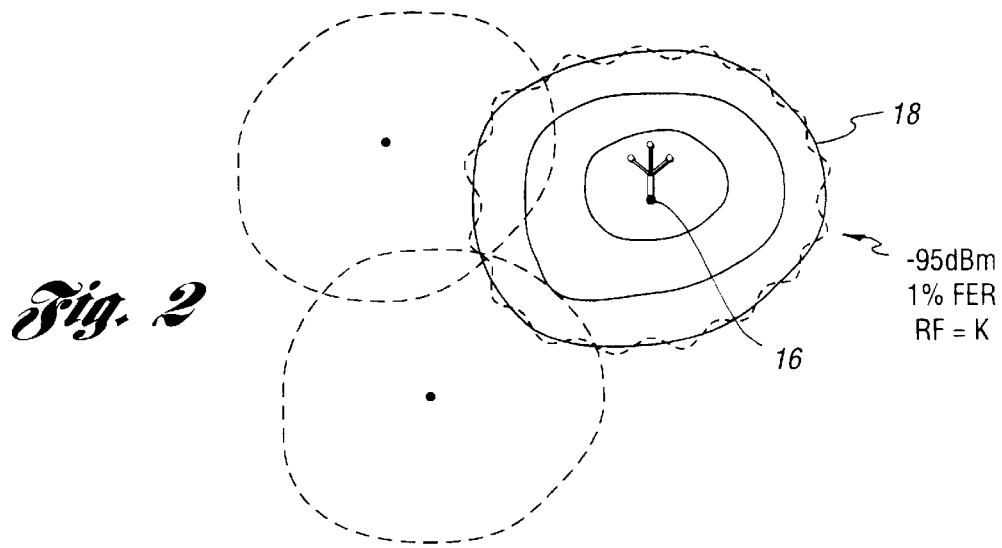
FIG. 2 is a diagram of cell contours and coverage areas according to the method and system of the present invention.

Any of a number of known cellular communication system planning or prediction tools are then employed to calculate coverage areas dependent primarily upon the signal level parameter. Such coverage areas are shown in FIG. 2, which is a diagram of cell contours and coverage areas according to the method and system of the present invention. As seen therein, each coverage area is represented by a contour line of a selected signal level around the base station (16) at the selected FER. More specifically, contour line (18) represents the coverage area resulting for the signal level of approximately −95 dBm at the approximately 1% FER depicted in FIG. 1.

As previously stated, the cell size is determined by the contour that corresponds to the desired signal level at the given FER. It should be noted that all surface cover (i.e., urban, suburban, rural, etc.) and terrain information are included in the predicted signal level. Indeed, such parameters are used as input to the planning or prediction tool.

Referring again to FIG. 1, for CDMA communication systems, different graphs are observed for the forward and the reverse links of the percent FER as a function of signal levels. Therefore, an average signal level value provided by the reverse links is preferably taken at the 1% FER previously mentioned.

It can thus be seen that cell size will vary depending upon the environment, which includes both the prevailing terrain and surface cover (i.e., urban, suburban, rural, etc.), as well as traffic loading. This remains true even though the conditions (signal level at a given FER) are the same for each cell. The present invention therefore provides for more efficient and economical design, development and deployment of CDMA communication systems and the like.

Figure 3:
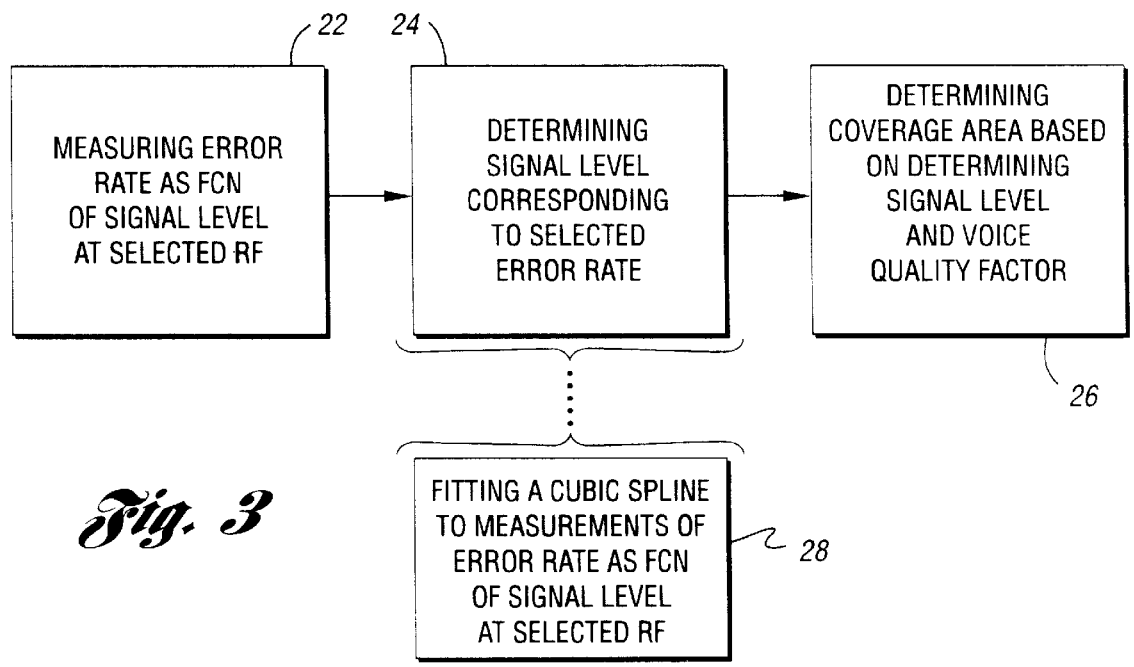
FIG. 3 is a simplified flowchart of the method of the present invention.

Referring next to FIG. 3, a simplified flowchart of the method of the present invention is shown, depicted generally by reference numeral 20. As seen therein, the method (20) comprises measuring (22) error rate as a function of signal level at a selected radio frequency (RF), and determining (24) a signal level corresponding to a selected error based on the measurements of error rate as a function of signal level. The method further comprises determining (26) a coverage area based on the signal level determined and a voice quality factor.

In that regard, it should be noted that the desired signal level may be varied if the resulting voice quality is not sufficient. Such a variation of the desired signal level will, of course, result in a change in coverage area for the cell. Nevertheless, since error rate (i.e., FER for CDMA systems) is related to voice quality, the signal level determined for the selected error rate will typically provide acceptable voice quality.

Figure 4:
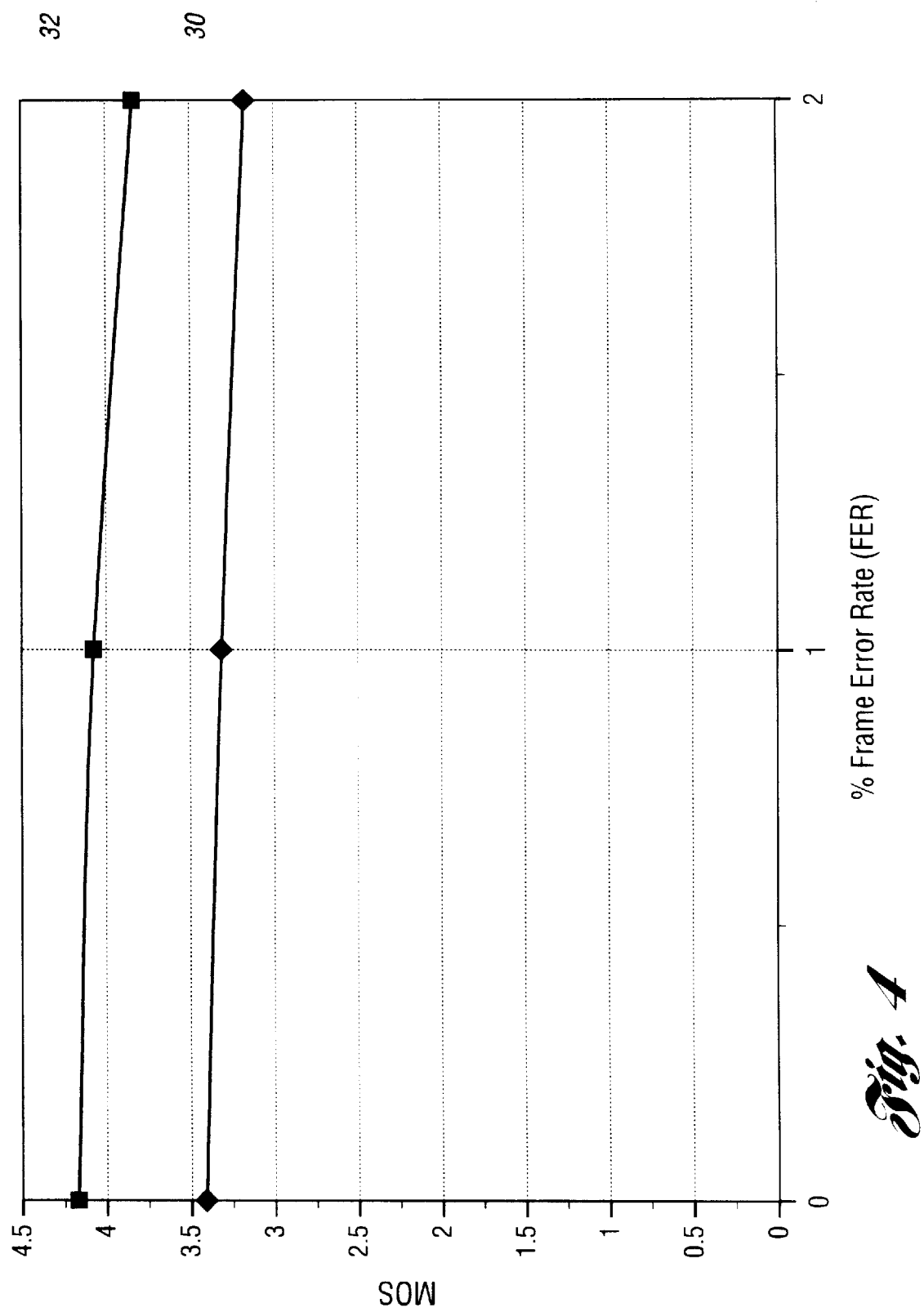
FIG. 4 is a graphic representation of voice quality versus FER according to the method and system of the present invention.

Referring next to FIG. 4, a graphic representation of voice quality versus 1% FER is shown. As seen therein, voice quality is measured in Mean Opinion Score (MOS) units, wherein a value of five (5.0) is considered excellent voice quality. The curves shown are typical results obtained for certain test conditions for 8 Kilobit (Kb) (30) and 13 Kb (32) vocoder rates.

As seen in FIG. 4, an approximately 1% FER, as discussed above with respect to FIGS. 1 and 2, corresponds to approximately 3.4 MOS for an 8 Kb vocoder rate. Similarly, an approximately 1% FER corresponds to approximately 4.0 MOS for a 13 Kb vocoder rate. In either case, both such MOS values indicate good voice quality.

Referring again to FIG. 3, as previously stated, determining (24) a signal level corresponding to a selected error rate includes fitting (28) a cubic spline to the CDMA communication system field measurements of FER as a function of signal level. As also previously stated, however, other fitting techniques may be employed. In that same regard, determining (26) a coverage area may also be based on other factors including a terrain factor, a surface cover factor (i.e., urban, suburban, rural, etc.), and/or a traffic loading factor.

As also previously stated, the FER selected in the method (20) of the present invention is preferably 1%. Once again, for TDMA based systems such as GSM, a Bit Error Rate (BER) of approximately 3% is acceptable. Similarly, the selected radio frequency may be 800 MHz or 1800 MHz. Appropriate computer hardware (including input and output devices, a processor, and a memory) and software (including the known planning/prediction tools previously discussed) provide the means for accomplishing the steps of the method (20) disclosed herein.

As is readily apparent from the foregoing description, then, the present invention provides an improved method and system for designing a cell for a CDMA communication system and the like. More specifically, the present invention provides a method and system for designing a cell for a CDMA communication system and the like that account for the well known parameters associated with such cell design, with emphasis on those parameters having the most importance to proper operation of the CDMA system, particularly signal level, FER, and voice quality. The present invention further provides a method and system for designing a cell for a CDMA communication system and the like that provide for accurate determination of coverage area and cell boundaries given the prevailing environmental conditions, including terrain and surface cover (i.e., urban, suburban, rural, etc.).

It is to be understood that the present invention has been described in an illustrative manner and the terminology which has been used is intended to be in the nature of words of description rather than of limitation. As previously stated, many modifications and variations of the present invention are possible in light of the above teachings. Therefore, it is also to be understood that, within the scope of the following claims, the invention may be practiced otherwise than as specifically described.

What is claimed is:

1. A method for designing a cellular code division multiple access communication system and the like, the method comprising:

measuring error rate as a function of signal level at a selected radio frequency;

determining a signal level corresponding to a selected error rate based on the measurements of error rate as a function of signal level;

determining a coverage area of a new cell for use in the communication system based on the signal level determined;

determining a voice quality level corresponding to the selected error rate;

modifying the signal level determined if the voice quality level determined is less than a selected threshold; and determining a modified coverage area for the cell based on the modified signal level.

2. The method of claim 1 wherein determining a signal level corresponding to a selected error rate includes fitting a cubic spline to the measurements of error rate as a function of signal level.

3. The method of claim 1 wherein the error rate is Frame Error Rate (FER).

4. The method of claim 1 wherein the error rate is Bit Error Rate.

5. The method of claim 1 wherein determining a coverage area is further based on a terrain factor.

6. The method of claim 1 wherein determining a coverage area is further based on a surface cover factor.

7. The method of claim 1 wherein determining a coverage area is further based on a traffic loading factor.

8. The method of claim 3 wherein the selected FER is approximately 1%.

9. The method of claim 1 wherein the selected radio frequency is approximately 800 MHz.

10. The method of claim 1 wherein the selected radio frequency is approximately 1800 MHz.

11. A system for designing a cellular code division multiple access communication system and the like, the system comprising:

means for measuring error rate as a function of signal level at a selected radio frequency;

means for determining a signal level corresponding to a selected error rate based on the measurements of error rate as a function of signal level;

means for determining a coverage area of a new cell for use in the communication system based on the signal level determined;

means for determining a voice quality level corresponding to the selected error rate;

means for modifying the signal level determined if the voice quality level determined is less than a selected threshold; and means for determining a modified coverage area for the cell based on the modified signal level.

12. The system of claim 11 wherein the means for determining a signal level corresponding to a selected error rate includes means for fitting a cubic spline to the measurements of error rate as a function of signal level.

13. The system of claim 11 wherein the error rate is Frame Error Rate (FER).

14. The system of claim 11 wherein the error rate is Bit Error Rate.

15. The system of claim 11 wherein the means for determining a coverage area does so further based on a terrain factor.

16. The system of claim 11 wherein the means for determining a coverage area does so further based on a surface cover factor.

17. The system of claim 11 wherein the means for determining a coverage area does so further based on a traffic loading factor.

18. The system of claim 13 wherein the selected FER is approximately 1%.

19. The system of claim 11 wherein the selected radio frequency is approximately 800 MHz.

20. The system of claim 11 wherein the selected radio frequency is approximately 1800 MHz.

* * * * *